United States Patent [19]
Kubota

[11] Patent Number: 5,894,091
[45] Date of Patent: Apr. 13, 1999

[54] COMPOSITE SENSOR

[75] Inventor: Tomoyuki Kubota, Susono, Japan

[73] Assignee: Texas Instruments Incorporated, Dallas, Tex.

[21] Appl. No.: 08/855,411

[22] Filed: May 13, 1997

[30] Foreign Application Priority Data

May 30, 1996 [JP] Japan .................... 8-159047

[51] Int. Cl.$^6$ .................... G01P 9/04; G01P 15/125
[52] U.S. Cl. .................... 73/504.12; 73/514.32; 73/504.04; 361/280
[58] Field of Search .................... 73/504.04, 504.12, 73/504.14, 510, 514.18, 514.24, 514.32, 514.38; 361/280

[56] References Cited

U.S. PATENT DOCUMENTS

| | | | |
|---|---|---|---|
| 5,487,305 | 1/1996 | Ristic et al. .................... | 73/514.32 |
| 5,610,334 | 3/1997 | Fima et al. .................... | 73/504.12 |

*Primary Examiner*—John E. Chapman
*Attorney, Agent, or Firm*—Russell E. Baumann; Richard L. Donaldson

[57] ABSTRACT

Fixed electrodes (A through F) are formed by means of a structural layer that has been provided on fixed bodies ($7_1$ through $7_4$) of a silicon micro-machined substrate and a movable electrode (G) is formed by a movable body attached to fixed bodies ($5_1$ through $5_4$) by flexible members ($6_1$ through $6_4$). Variable capacitors of the parallel plate-type are formed by the movable electrode (G) and the fixed electrodes (A through F). When the movable electrode (G) has been vibrated, the Coriolis force incident to rotation or the force incident to acceleration are added to the movable electrode (G), with a result that the charge of the various variable capacitors change. By detecting the change in charge, both angular velocity and acceleration can be obtained. By providing another variable capacitor formed by a mass portion (H) by a movable body and the substrate, acceleration components in the directions of three axes can be detected.

6 Claims, 10 Drawing Sheets

COMPOSITE SENSOR

BACKGROUND OF THE INVENTION

This invention relates generally to a composite sensor which detects acceleration or angular velocity and in particular to a composite sensor that has been constructed by micro-machining silicon.

Some composite systems combining an acceleration sensor and an angular velocity sensor have been made public recently. One of the representative systems pertains to an automobile attitude control, commonly called VDC (vehicle dynamic control) or VSC (vehicle stability control). These composite sensor systems are used in the comprehensive control of the movement of automobiles by the adjustment of brake pressure of individual wheels for the purpose of preventing over or under steering at the time of rotational movement of the vehicle. For such a purpose, a two-axis acceleration sensor and a one axis angular velocity sensor are deemed to be essential.

Navigational systems of automobiles have quickly become popular in recent years. In such systems, the signal of wheel velocity, etc., as received from the automobile itself, is used in the calculation of the running distance of the automobile. However, the connection for signal reception is troublesome and as a result there is a demand for a stand alone system. Therefore, a navigation system has been proposed for accurately knowing the position of an automobile by detecting the change in direction of its progress at an intersection or a curve by means of an angular velocity sensor and by determining the running distance by means of an acceleration sensor, thereby accurately knowing the position of the automobile. An angular velocity sensor and an acceleration sensor which are used in a composite sensor according to the prior art will be explained briefly by referring to the attached drawings.

Figure 9:
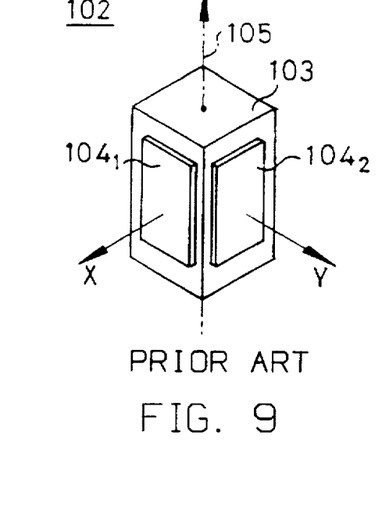
FIG. 9 is a perspective view of an angular velocity sensor made in accordance with the prior art.

With reference to FIG. 9, reference numeral 102 indicates a conventional angular velocity sensor having a metallic body 103 in the shape of a rectangular parallelepiped. Piezoelectric bodies $104_1$ and $104_2$ are provided on metallic body 103 on two respective sides normal to one another.

Figure 9A:
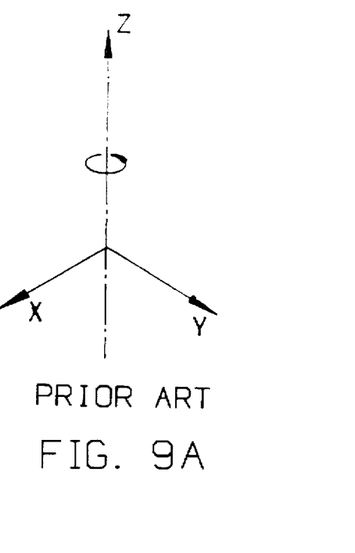
FIG. 9(A) depicts the X, Y, Z-axes of the FIG. 9 sensor

Angular velocity sensor 102 is arranged so that a moving body with a rotary axis 105 forms the Z axis in the case where the normal lines of the vibration surface of the piezoelectric bodies 104hd 1and $104_2$ are made along the X axis and Y axis respectively, as shown in FIG. 9(A).

Figure 9B:
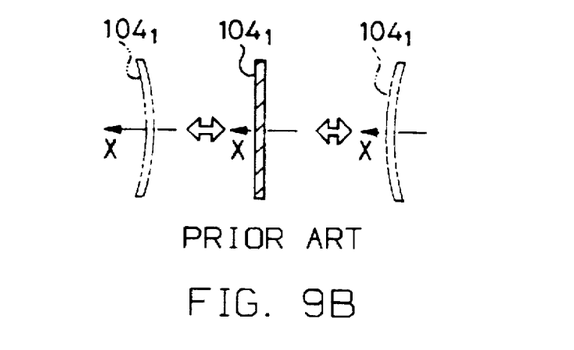
FIG. 9(B) is a schematic diagram shown for the purpose of explaining the operation of the sensor.

In the case where piezoelectric body $104_1$ is set as the driving side and piezoelectric body $104_2$ is set as the detection side, if an alternating current voltage is impressed on piezoelectric body $104_1$ on the driving side, thereby vibrating it in the X axis direction as is shown in FIG. 9(B), the rotary movement of the moving object in which the sensor is mounted produces a Coriolis force, thereby generating a vibrating force in a direction (the Y axis direction) which crosses, at a right angle, with the direction of vibration of piezoelectric body $104_1$ on the driving side. Its vibration is transmitted to metallic body 103 and piezoelectric body $104_2$ on the detection side is vibrated.

The cycle of the vibration of piezoelectric body $104_2$ on the detection side that is generated at that time is the same as the cycle of the vibration in the X-axis direction of the piezoelectric body $104_1$ on the driving side, with the amplitude being of such magnitude as is in conformity with the Coriolis force. Since the electromotive force is generated in piezoelectric body $104_2$ as a result of the vibration of the piezoelectric body $104_2$ on the detection side, the Coriolis force can be detected by measuring its magnitude, thereby obtaining the magnitude of the angular velocity.

Figure 10:
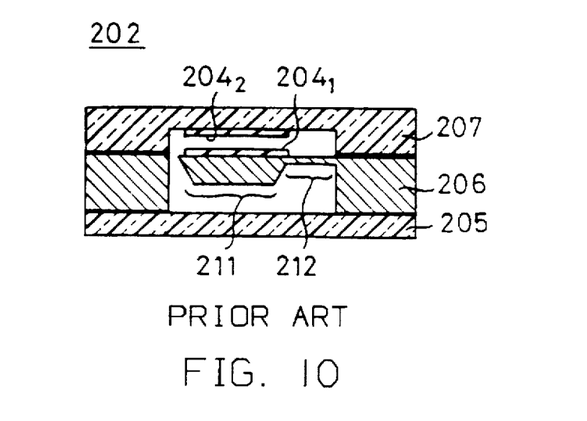
FIG. 10 is a cross sectional view of an acceleration sensor made in accordance with the prior art.

With reference to the acceleration sensor, in FIG. 10 the acceleration sensor 202 according to the prior art is composed of base 205 of Pyrex plate glass, an etched silicon mass plate 206 and a cap 207 of Pyrex plate glass having a concave recess in the bottom thereof. Base 205, mass plate 206 and cap 207 are tightly jointed together in this order.

A mass portion 211 having a relatively large thickness and a bridge portion 212 having a relatively thin thickness are provided within a recess of mass plate 206 so that mass portion 211 is movably supported inside acceleration sensor 202.

On the upper surface of mass portion 211 and on the facing bottom surface of the recess in cap 207, electrodes $204_1$ and $204_2$ made of a thin metal film are formed, respectively, resulting in a variable capacitor of the parallel plate-type formed by electrodes $204_1$ and $204_2$.

When sensor 202 is subjected to acceleration, mass portion 211 is displaced in conformity with the size of the acceleration in the normal direction of electrodes $204_1$ and $204_2$, with a result that the distance between the two electrodes $204_1$ and $204_2$ changes. As a consequence, the capacitance of the capacitor which is formed by electrodes $204_1$ and $204_2$ changes. If the amount of the change is detected, the magnitude of the acceleration can be measured.

However, the manufacturing steps for the angular velocity sensor and the manufacturing steps for the acceleration sensor as described above are completely different. Such separately manufactured items combined to make a composite sensor, are expensive, more cumbersome and larger in size than is desirable.

In addition, a composite sensor prepared by combining the acceleration sensor and angular velocity sensor as described could not conveniently be arranged on a printed substrate and would be difficult to connect to a measuring circuit. It is therefore desirable to provide a solution to this problem.

SUMMARY OF THE INVENTION

An object of the present invention is the provision of a sensor which overcomes the limitations of conventional technology as described above. Another object is the provision of a composite sensor sensing acceleration and angular velocity which can be prepared by the same manufacturing process. Another object of this invention is the provision of a small, light-weight and inexpensive composite sensor. Yet another object is the provision of a composite sensor which can be readily accommodated on a printed substrate.

Briefly described, a sensor made in accordance with the invention is made by patterning and etching a substrate on which a sacrificial layer and a structural layer have been formed in this order. A movable body is formed by removing the sacrificial layer under the bottom of the structural layer at selected locations and a fixed body is formed by leaving the sacrificial layer under the bottom of the structural layer at other selected locations. A fixed electrode is formed from part of the fixed body and a movable electrode and associated flexible members comprise the movable body.

According to a feature of the invention, a plurality of parallel plate-type variable capacitors are formed by the movable electrode, flexibly supported by the fixed body through the flexible members, and the fixed electrodes. Voltage is impressed on the variable capacitors, thereby vibrating the movable electrode. Coriolis force that is added to the movable electrode upon rotary movement is detected by the variable capacitors, thereby enabling the calculation of the angular velocity.

According to another feature of the invention, the movable electrode that comprises each of the variable capacitors move together thereby reducing the required area of the composite sensor.

According to yet another feature of the invention, the variable capacitors whose capacitance changes as a result of the rotary movement, are arranged in such a way as to detect the components in the dual axis directions of acceleration parallel with the substrate at the time of the acceleration movement, acceleration being detectable in addition to the angular velocity.

According to a feature of one embodiment of the invention, voltage is impressed on the variable capacitors at each half cycle of the vibration of the movable electrode with the capacitors used as driving capacitors for the vibration of the movable electrode and the variable capacitors are then used as detection capacitors for the detection of a charge variation during the half cycle when voltage is not impressed.

In the above case, the area of the fixed electrode that is used in the detection of a variation in charge and the area of the fixed electrode that is used for driving the movable electrode increase, with a result that the driving force becomes greater and the detection sensitivity is enhanced.

According to another feature of the invention, a mass portion of the movable body moves together with the movable electrode of the variable capacitor. A parallel plate-type capacitor is formed between the mass portion and the substrate of the composite sensor so that the force that has been added in the vertical direction relative to the substrate can be detected through a variation in charge of the parallel plate-type capacitor.

According to the invention as described above, a movable body is formed by removing the sacrificial layer under the bottom of the structural layer at selected locations and a fixed body is formed by leaving in place the sacrificial layer under the bottom of the structural layer at other selected locations in connection with the application of patterning and etching of the substrate on which the sacrificial layer and the structural layer have been formed.

A capacitor of parallel plate-type is formed by using the movable body as a movable electrode and the fixed body which does not change position relative to the substrate as a fixed electrode. Certain parts of the movable body form flexible arms with one end of the flexible arms integrally attached to the fixed body, and the other end of the arms supporting the movable electrode. The distance between the movable electrode and the fixed electrode can change, with a consequence that the capacitor comprised by the movable electrode and fixed electrode becomes a variable capacitor.

BRIEF DESCRIPTION OF THE DRAWINGS

Other objects, advantages and details of the novel and improved sensor of the invention appear in the following detailed description of preferred embodiments of the invention, the detailed description referring to the drawings in which:

FIGS. 7(a), 7(b-1) and 7(b-2) are schematic diagrams shown for the purpose of explaining vibration of the movable electrode where the composite sensor made according to the invention is stationary;

FIGS. 8(a-1), 8(a-2) are schematic diagrams shown for the purpose of explaining vibration of the movable electrode were the composite sensor is subjected to rotary motion;

FIGS. 8(b-1), 8(b-2) are similar diagrams to those of FIGS. 8(a-1), 8(a-2) for the case where acceleration has been added in the direction of the X-axis;

FIGS. 8(c-1), 8(c-2) are similar diagrams to those of FIGS. 8(b-1), 8(b-2) in the case where acceleration has been added in the direction of the Y-axis;

DETAILED DESCRIPTION OF PREFERRED EMBODIMENTS

Figure 7:
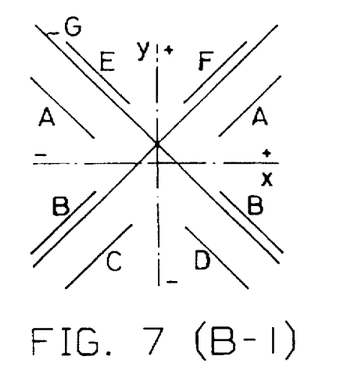
Figure 7A:
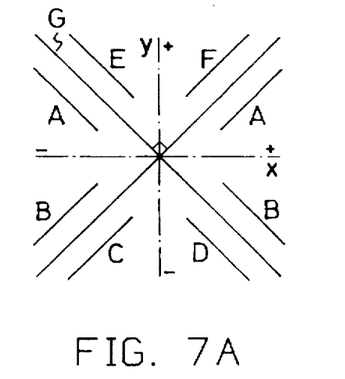
Figure 8:
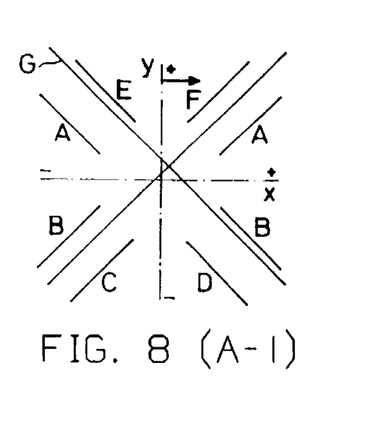

Reference will first be made to FIGS. 7 and 8 which are schematic plan views of the composite sensor. Character G is a movable electrode in which the movable body has been formed in the shape of an X. The movable electrode is flexibly attached to the fixed body by a flexible member which is not shown in the schematic and is constructed in such a way that it can be moved relative to the substrate in the X–Y plane in parallel relationship with the substrate. In connection with this movement, movable electrode G moves as a whole.

Characters A through F are fixed electrodes, that is, they are stationary relative to the substrate. Fixed electrodes A through F and movable electrode G are arranged to face one another in parallel relationship forming variable capacitors of the parallel plate-type.

Two variable capacitors formed by two fixed electrodes A and movable electrode G, and two variable capacitors formed by two fixed electrodes B and movable electrode G, are driving capacitors for driving movable electrode G. When voltage is impressed on the two fixed electrodes A at the same time, movable electrode G shifts from the position shown in FIG. 7(a) in the negative direction of the Y-axis and, when voltage is impressed on the two fixed electrodes B at the same time, movable electrode G moves in the positive direction of the Y-axis. When voltage is impressed alternately between the fixed electrode A side and the fixed electrode B side, therefore, movable electrode G vibrates in the direction of the Y-axis as shown in FIGS. 7(b-1), 7(b-2).

The variable capacitors formed by fixed electrodes C through F and movable electrode G serves as a detecting capacitors and the charge of the detecting capacitor comprising fixed electrodes E and F and movable electrode G reaches the maximum value when movable electrode G has shifted in the positive direction of the Y-axis, FIG. 7(b-1).

On the other hand, the charge of the detecting capacitors comprising fixed electrodes C and D and movable electrode G reaches the maximum value when the movable electrode G has moved in the negative direction of the Y-axis, FIG. 7(b-2).

A composite sensor having fixed electrodes A through F and movable electrode G of the type described is adapted to be mounted in a movable body, such as a vehicle. In use, the movable electrode G is vibrated in the direction of the Y-axis in the X–Y plane. When the moving body engages in rotary motion at the angular velocity of (omega), the Z-axis, i.e., the axis which extends in the vertical direction to the surface of this sheet of paper, serves as the rotary axis with the Coriolis force Fc being added to movable electrode G. The magnitude of this Coriolis force can be expressed by the following, where the mass of the movable electrode G is represented by m and its vibration velocity v:

$$Fc = 2 \cdot m \cdot v \cdot (omega)$$

In this case, the direction in which the Coriolis force Fc is added forms a right angle with the direction of vibration; however, its direction becomes opposite, depending upon the direction in which movable electrode G is moving. If, for example, the direction of the addition is in the positive direction of the X-axis, as is shown by an arrow mark in FIG. 8(a-1), when movable electrode G is moving in the positive direction on the Y-axis, the direction will be in the negative direction on the X-axis when the movable electrode G moves in the negative direction on Y-axis, (FIG. 8(a-2).

When the charge of each detecting comparator, when there is rotary motion, and therefore Coriolis force Fc is being added due to the rotary motion, is compared with the charge of the same comparator when there is no rotary motion, and hence no Coriolis force Fc, the charge values of the detecting capacitors formed by fixed electrode E and movable electrode G and the detecting capacitor formed by fixed electrode D and movable electrode G increase but the respective detecting capacitors lag by one half cycle of the vibration in reaching the maximum charge.

Since it is possible to determine the mass m of movable electrode G, the spring constant and the vibration velocity of the flexible member beforehand, the Coriolis force Fc can be determined and the angular velocity calculated, provided that the detecting capacitor whose capacitance has changed is specified and its maximum charge is detected.

Next, the principle governing the measurement in the case where the acceleration is detected by using this invention will be explained below.

In the case where the moving object wherein the composite sensor has been mounted engages in acceleration movement and a force is added in the positive direction on the X-axis to movable electrode G as shown by an arrow mark in FIG. 8(b-1, b-2), the charge values of the detecting capacitors comprising fixed electrodes E and C and movable electrode G increase; however, they lag one half cycle in reaching the maximum charge.

In any case where a force based on acceleration has been added to movable electrode G in the positive direction on the Y-axis as shown by an arrow mark in FIG. 8(c-1, c-2), the charge value of the detecting capacitors comprising fixed electrodes E and F and movable electrode G increases and the maximum charge is reached respectively in synchronization with the vibrations.

Thus, acceleration can be obtained from the spring constant, vibration velocity, etc., of the flexible member, mass m of movable electrode G and the timing showing the maximum charge of each detecting capacitor.

In actual use of the composite sensor, a composite of the Coriolis force based on the angular velocity and the force based on the acceleration components in the X and Y-axes are added to the movable electrode G. However, the magnitude of the angular velocity and of the acceleration in the two-axis direction can be obtained from the change in the maximum charge value of each detecting comparator and the timing showing the maximum charge.

Moreover, since the mass part comprises a movable body and the parallel plate-type capacitor comprises the mass part and the silicon substrate, the charge of the parallel plate-type capacitor changes when a force in the direction of the Z-axis relative to the substrate has been added. Thus, acceleration in the direction of Z-axis can be detected.

The mass part is so constructed as to move with the movable electrode of the driving capacitors so that vibration takes place in a plane which is parallel with the substrate in conformity with the vibrations of the movable electrode. When rotary movement has developed around the X or the Y-axis; however, Coriolis force is generated in the direction of the Z-axis. Because of the Coriolis force, the mass part vibrates in the direction of the Z-axis and the charge of the parallel plate-type capacitor comprising the mass part and the substrate vibrates and changes. Therefore, the angular velocity around the X-axis and the angular velocity around the Y-axis can be determined by detecting such change.

Figures 1, 1B:
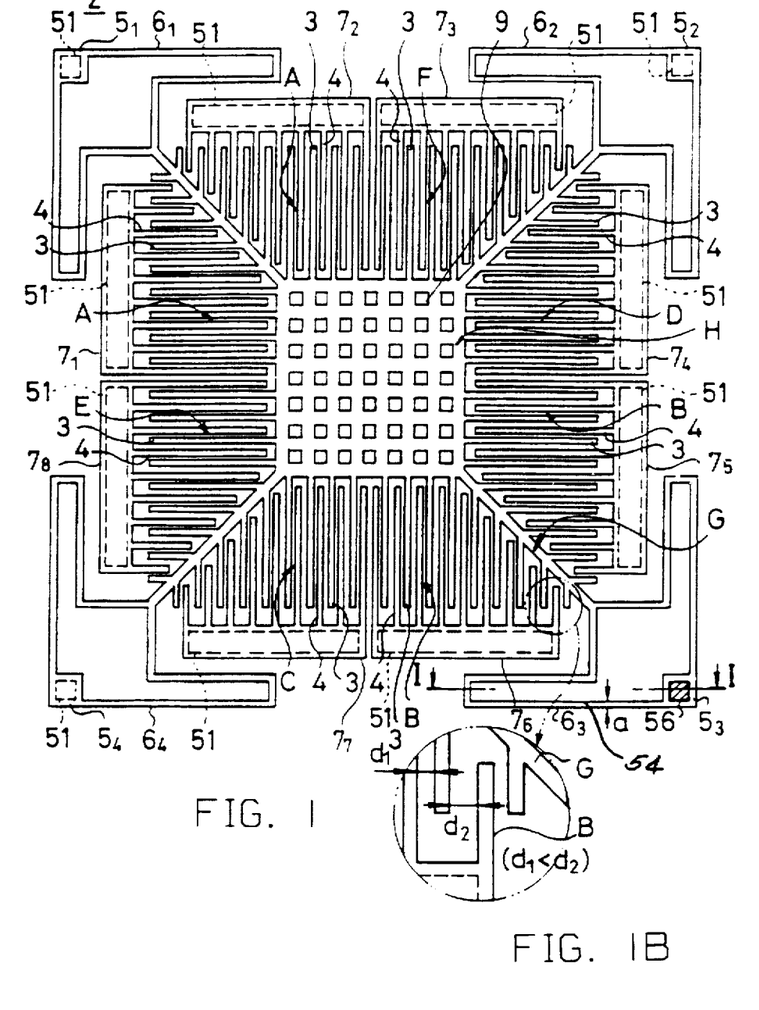
FIG. 1 is a top plan view of a composite sensor made in accordance with the invention with the substrate not shown for purposes of illustration.
FIG. 1(A) depicts the orientation of the X–Y axes of the FIG. 1 structure and FIG. 1(B) is an enlarged portion of the FIG. 1 sensor.

With reference to FIG. 1, numeral 2 indicates a composite sensor made in accordance with the invention. Composite sensor 2 has a movable electrode G.

Movable electrode G comprises a movable body in the form of a comb 3, with the electrode portion being elongated, spaced apart teeth extending from arms formed in a generally X-shaped configuration and a mass part H, also a movable electrode, comprising a movable body being disposed at the center of the X-shaped configuration.

Figure 1A:
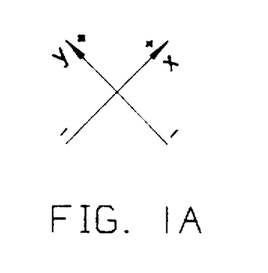

In the case where the obliquely upper left direction from the center of FIG. 1 is the positive direction of the Y-axis and the obliquely upper right direction from the center of FIG. 1 is the positive direction of the X-axis, as shown in FIG. 1(A), and voltage is impressed alternately between the two fixed electrodes A and the two fixed electrodes B, the direction of vibration of the movable electrode G is in the direction of the Y-axis corresponding to the direction of the vibration of movable electrode G as shown in FIGS. 7 and 8.

The fixed electrodes A through F are also formed like a comb with elongated, spaced apart teeth. The teeth of comb part 4 of each of the fixed electrodes A through F and the teeth of comb part 3 of the movable electrode G are interdigitated and arranged in parallel with each other at a distance of d1 and a distance of d2 as seen in FIG. 1(B). The distance d1 is made smaller than the distance d2 and a capacitor of the parallel plate-type is formed at a distance of d1 between the comb parts 3 and 4.

Composite sensor 2 is manufactured as patterning and etching steps are repeatedly applied to the substrate where a sacrificial layer and a structural layer are positioned in this order on a silicon substrate. Movable electrode G, mass part H, and flexible parts $6_1$ through $6_4$ are formed into a movable body comprising a structural layer with the sacrificial layer disposed thereunder being removed. The movable electrode supports $5_1$ through $5_4$ and the fixed electrode supports $7_1$ through $7_8$ comprise the fixed body that has been formed by leaving the sacrificial layer under the bottom of the related portion of the structural layer.

The four corners of the movable electrode G are connected respectively to a corner of the flexible members $6_1$ through $6_4$ and the other ends of the flexible members $6_1$ through $6_4$ are connected to a respective movable electrode support $5_1$ through $5_4$ so that the movable electrode G can be displaced in the triple axial directions of the X, Y and Z-axes by the flexible members $6_1$ through $6_4$ having flexibility in the X, Y and Z-axial directions.

On the other hand, comb parts 4 of fixed electrodes A through F are connected to the fixed electrode supports $7_1$ through $7_8$ so as to be immovable relative to the substrate.

The manufacturing process for the composite sensor will be explained with reference to the cross section I—I in FIG. 1, i.e., FIGS. 6(a)–6(k).

Figure 6A:
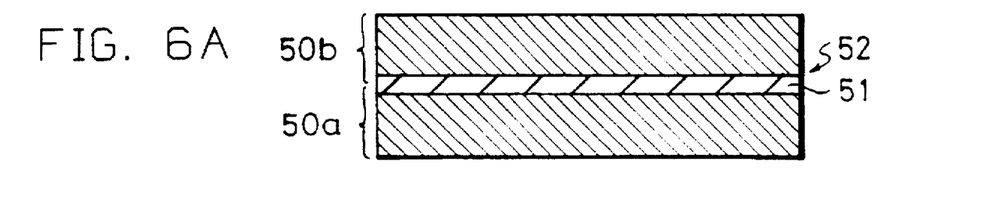
FIGS. 6(a)–6(k) show materials at various process steps in producing a composite sensor according to the invention.

Referring to FIG. 6(a), two monocrystalline silicon substrates 50a and 50b are formed with silicon oxide films 51 grown on two opposed surfaces. The substrates are joined together with the silicon oxide films tightly adhered to each other, thereby making one p-type silicon substrate 52, to cite an example.

Figure 6B:
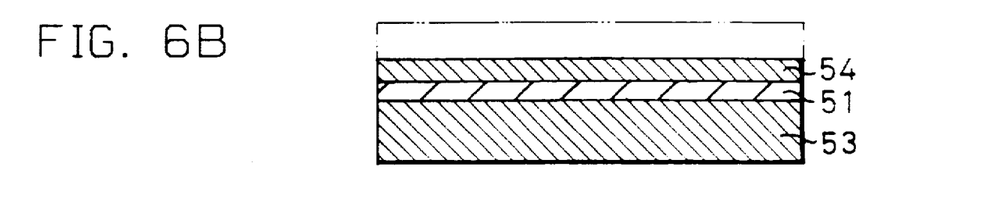

Next, as shown in FIG. 6(b), the top surface of substrate 50b of monocrystalline silicon substrate 52 is polished to form a structural layer 54 whose thickness is approximately 10 (mu) m. The monocrystalline silicon substrate 50a on the bottom is not polished, with substrate 53 being formed with the original thickness of substrate 50a. The thickness of the silicon oxide film located between the two monocrystalline silicon layers is approximately one (mu) m and this silicon oxide film is termed the sacrificial layer 51.

Figure 6C:
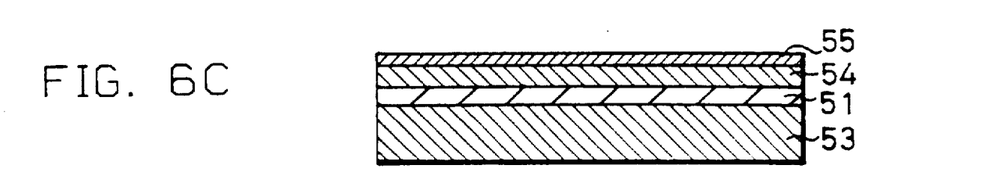
Figure 6D:
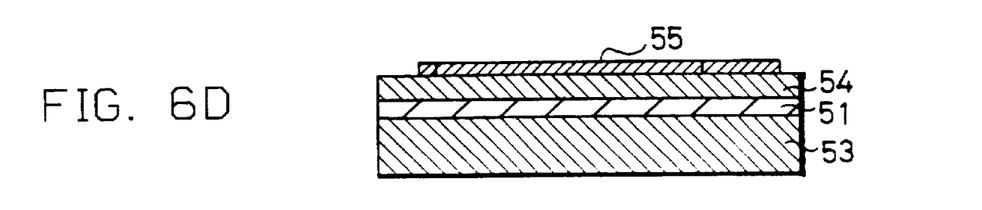

Next, FIG. 6(c), a thin aluminum film 55 is deposited on the entire surface of structural layer 54, with appropriate etching and patterning steps being carried out after a photolithographic step shown in FIG. 6(d).

Figure 6E:
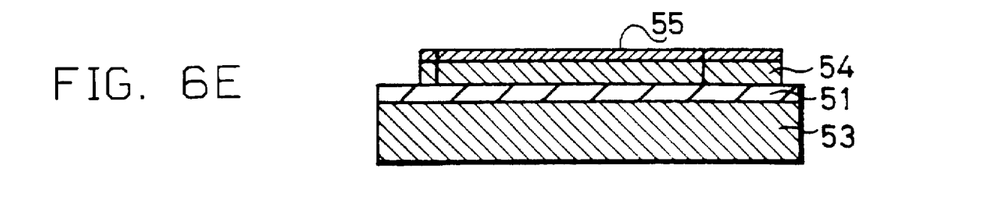

Anisotropic dry etching according to the RIE process is carried out by using the thin aluminum film 55 on the silicon substrate as a mask and selected portions of structural layer 54 are removed (FIG. 6(e)).

Figure 6F:
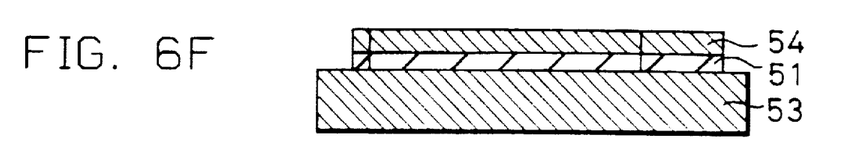

As the result of the removal of the structural layer, portions of the sacrificial layer 51 exposed to the surface are also removed by etching after the removal of the thin aluminum film (FIG. 6(F)); however, the sacrificial layer 51 is left under the bottom of the structural layer 54.

Figure 6G:
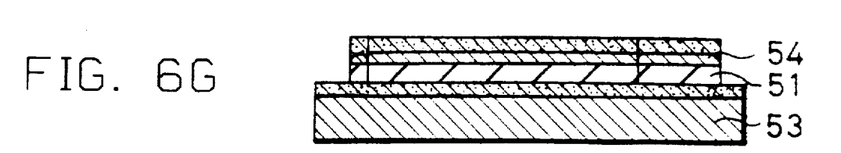

An ohmic layer is formed by doping substrate layer 53 and structural layer 54 (FIG. 6(g)).

Figure 6H:
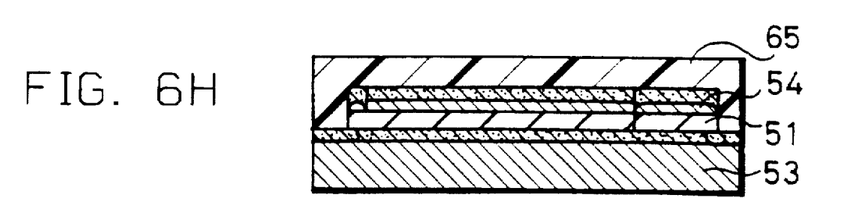
Figure 6I:
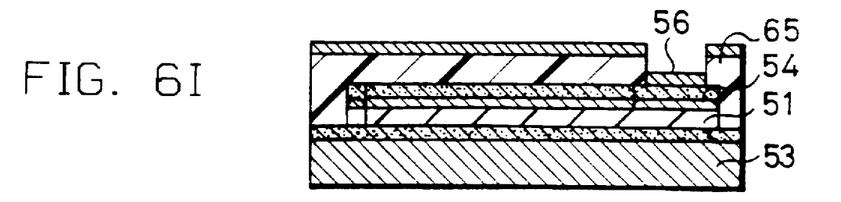
Figure 6J:
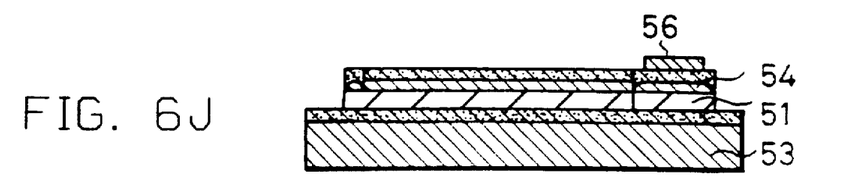
Figure 6K:
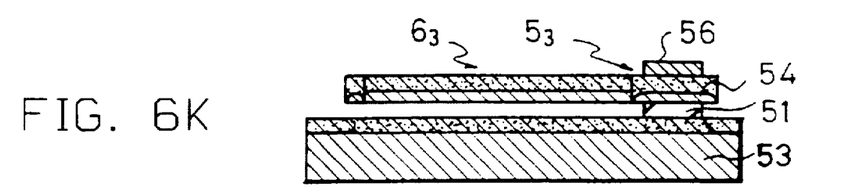

Next, a resist layer 65 is applied to the surface (FIG. 6(h)) and, after removing the resist layer at selected locations, the evaporation of a thin chromium platinum film is carried out (FIG. 6(i)). An electrode 56 is formed on the surface of the structural layer 54 comprising a thin chromium platinum layer shown in this figure. An electrode is also formed on the silicon substrate (not shown in the drawing). After forming electrode 56, the resist layer 65 is removed. At this point, the thin chromium platinum film deposited on resist 65 is removed along with resist 65 by a conventional lift-off method (FIG. 6(j)).

The entire structure is then soaked in a fluoric acid buffer solution (BHF). Sacrificial layer 51 is etched from the side thereof with a result that the sacrificial layer disposed under the bottom of the narrow structural layer 54 is removed as shown by the width "a" in FIG. 1. Flexible member $6_3$ is formed by the structural layer 54 with the sacrificial layer under that portion having been removed. The sacrificial layer under the bottom of the structural layer comprising the other flexible members $6_1$, $6_2$ and $6_4$ and the movable electrode G is also removed in the same manner.

Mass part H has a relatively large area. Window openings 9 are provided in the structural layer that comprises mass part H so that the structural layer itself is formed like a narrow mesh. Therefore, the fluoric acid buffer solution enters through the window openings 9 and removes the sacrificial layer under the bottom of mass part H.

On the other hand, the sacrificial layer still remains, even after the side etching, under portions of the bottom of the structural layer having a relatively large width. Therefore, such remaining sacrificial layer 51 and the structural layer 54 situated on its surface form a fixed body. Thus, a movable electrode support $5_3$ is formed as a fixed body. In like manner, the sacrificial layer 51 is left at the other movable electrode supports $5_1$, $5_2$ and $5_4$ and the fixed electrode supports $7_1$ through $7_8$.

In a composite sensor 2 made according to the above described process, movable electrode G is flexibly supported by flexible members $6_1$ through $6_4$ and is capable of being displaced in the X, Y and Z-axial directions. Therefore, the parallel plane or plate comparator comprising comb part 4 of the fixed electrodes A through F and the comb part 3 of the movable electrode G becomes a variable capacitor.

Since the teeth of comb part 3 of movable electrode G are made to move together, they will vibrate in the direction of the Y-axis when the variable capacitor comprising fixed electrodes A and B and movable electrode G is used as a driving capacitor and voltage is alternately impressed on fixed electrode A and fixed electrode B.

When a moving object with the composite sensor 2 mounted therein is subjected to rotary movement or an acceleration movement, the maximum charge of the variable capacitor comprising fixed electrodes A through F and movable electrode G changes. By detecting the change in charge, the angular velocity around the Z-axis and the acceleration in the direction which is in parallel with the X–Y plane can be measured.

The acceleration component in the direction of the Z-axis can be obtained by detecting the change in charge of the variable capacitor of the parallel plate-type comprising the silicon substrate and mass part H.

The above explanation applies where the driving capacitor and the detection capacitor have been provided separately. However, it is also possible to switch the same variable capacitor at every half cycle of the vibration between driving and detecting modes. The method of measuring the angular velocity and the acceleration in such a case will be explained with reference to FIG. 2 by allocating separate reference characters to the composite sensor shown in FIG. 1.

Figure 2:
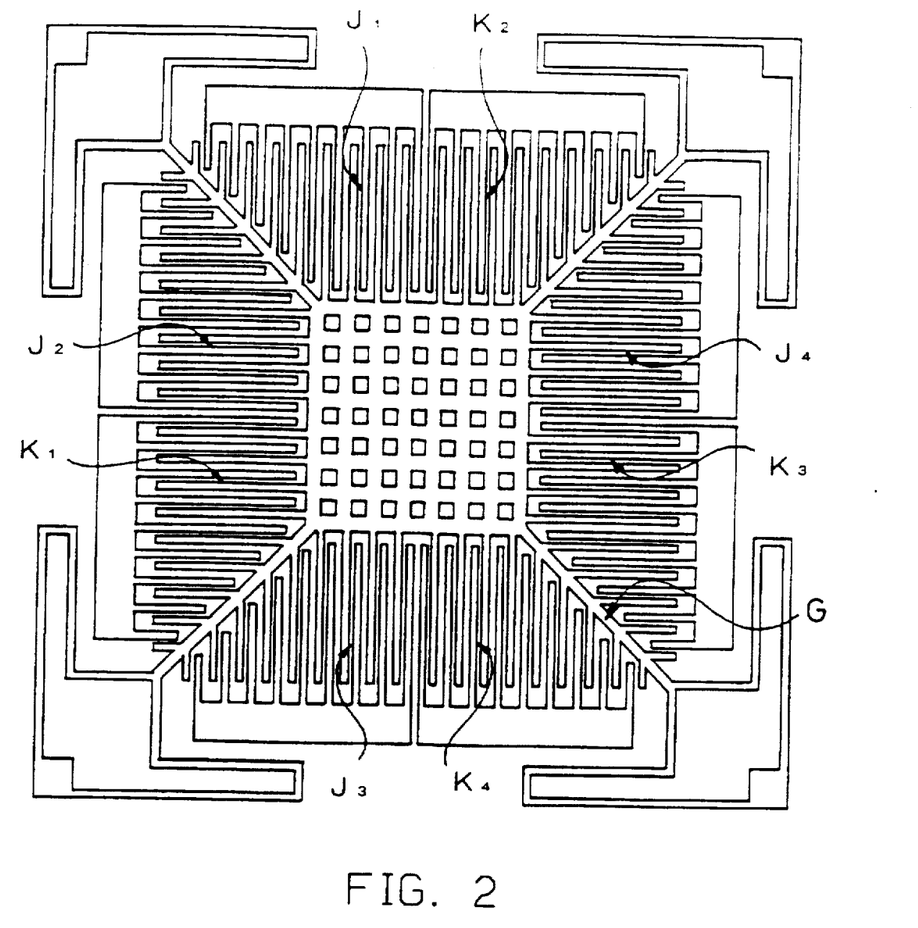
FIG. 2 is a view similar to FIG. 1 using different reference characters for the purpose of explaining a method of using the composite sensor and FIG. 2(A) depicts the orientation of the X–Y axes of the FIG. 2 sensor.
Figure 2A:
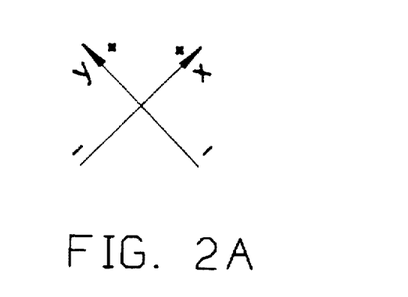

In FIG. 2, the variable capacitors are shown by characters $J_1$ through $J_4$ and characters $K_1$ through $K_4$. Characters $J_1$ through $J_4$ apply to the variable capacitors which move movable electrode G in the negative direction of the Y-axis when voltage is impressed and the characters $K_1$ through $K_4$ apply to the variable capacitors which move movable electrode G in the positive direction of the Y-axis when voltage is impressed.

Figure 4:
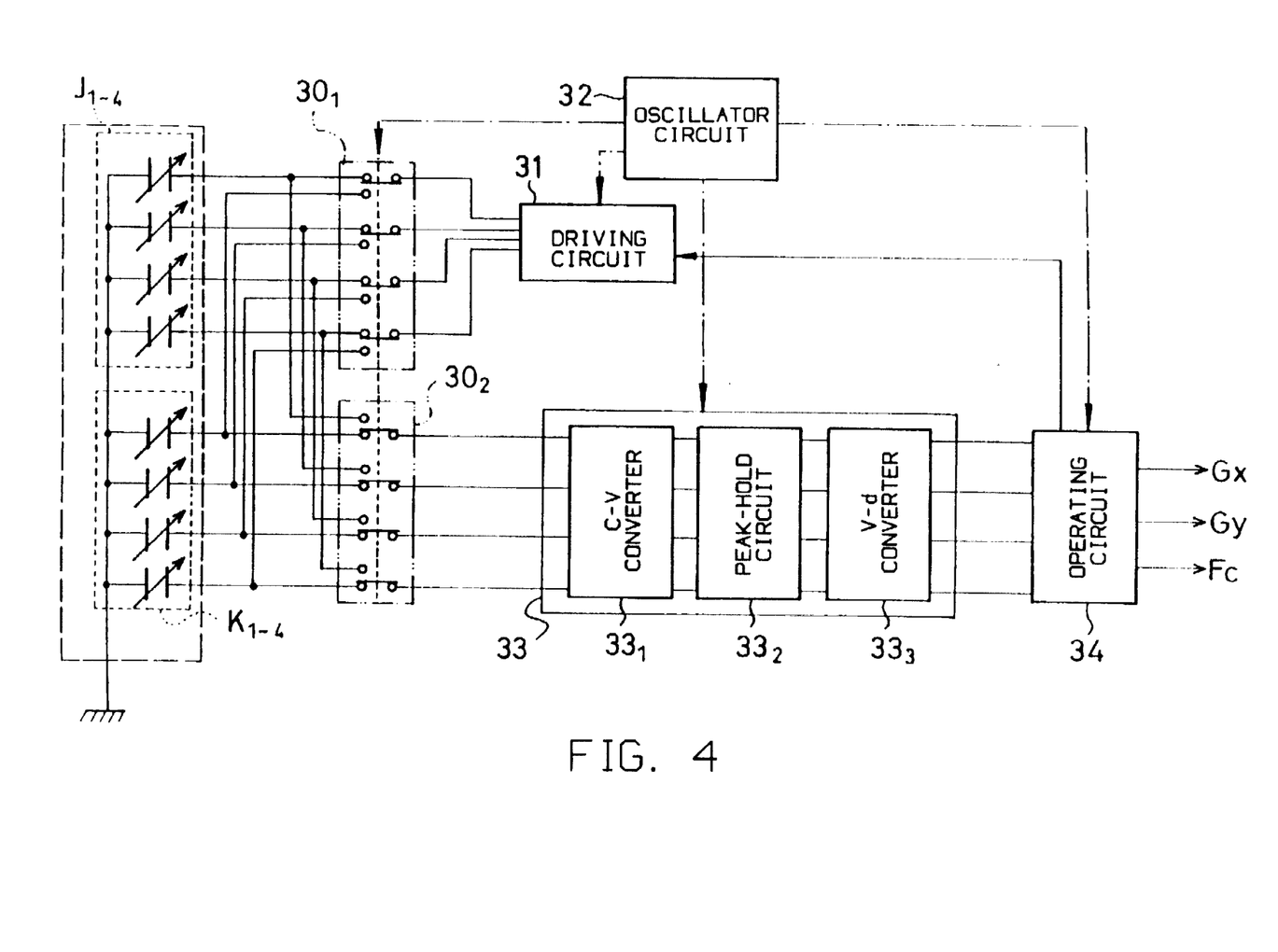
FIG. 4 is a block diagram of a circuit for measurement of angular velocity and acceleration using the composite sensor of the invention.

The variable capacitors are connected to the circuit shown in the block diagram in FIG. 4. Initially, this circuit connects the variable capacitors $J_1$ through $J_4$ to driving circuit 31 through a switch $30_1$, and connects variable capacitors $K_1$ through $K_4$ to a measuring circuit 33 through a switch $30_2$. When driving circuit 31 impresses voltage on variable capacitors $J_1$ through $J_4$, movable electrode G is shifted in the negative direction of the Y-axis. At this juncture, the charge on the variable capacitors $K_1$ through $K_4$ are converted to a voltage by C-V converter $33_1$ and their maximum values are separately directed by peak-hold circuit $33_2$. The maximum value is converted into the distance between movable electrode G and each fixed electrode by voltage-distance V-d converter $33_3$ which is outputted to operating circuit 34.

Next, by means of a clock signal that is inputted from oscillator circuit 32, switches $30_1$ and $30_2$ connect variable capacitors $K_1$ through $K_4$ to driving circuit 31 and variable capacitors $J_1$ through $J_4$ to measuring circuit 33 and, when the voltage is impressed on the variable capacitors $K_1$ through $K_4$ by driving circuit 31, movable electrode G is moved in the positive direction of the Y-axis. The maximum charge values of the variable capacitors $J_1$ through $J_4$ are detected by measuring circuit 33 and are outputted at operating circuit 34 as the distance between the electrodes.

Voltage is impressed alternately on the variable capacitors $J_1$ through $J_4$ and the variable capacitors $K_1$ through $K_4$ in this manner with movable electrode G being vibrated in the direction of the Y-axis. In addition, the maximum charge value of the eight variable capacitors can be measured on the variable capacitors during the period of time when voltage is not impressed. Therefore, the Coriolis force Fc and the acceleration components Gx and Gy in the direction of the X and the Y-axes can be calculated by operating circuit 34. Additionally, if the variation in charge of the variable capacitor formed between mass part H and the silicon substrate is measured, the acceleration component Gz in the direction of the Z-axis can be obtained separately.

Since the same variable capacitors are used for driving and detecting in this manner, the number of driving capacitors and detecting capacitors is increased. The driving force becomes greater and the detection sensitivity also improves as compared with the method of measurement described in connected with FIG. 1.

Figure 3:
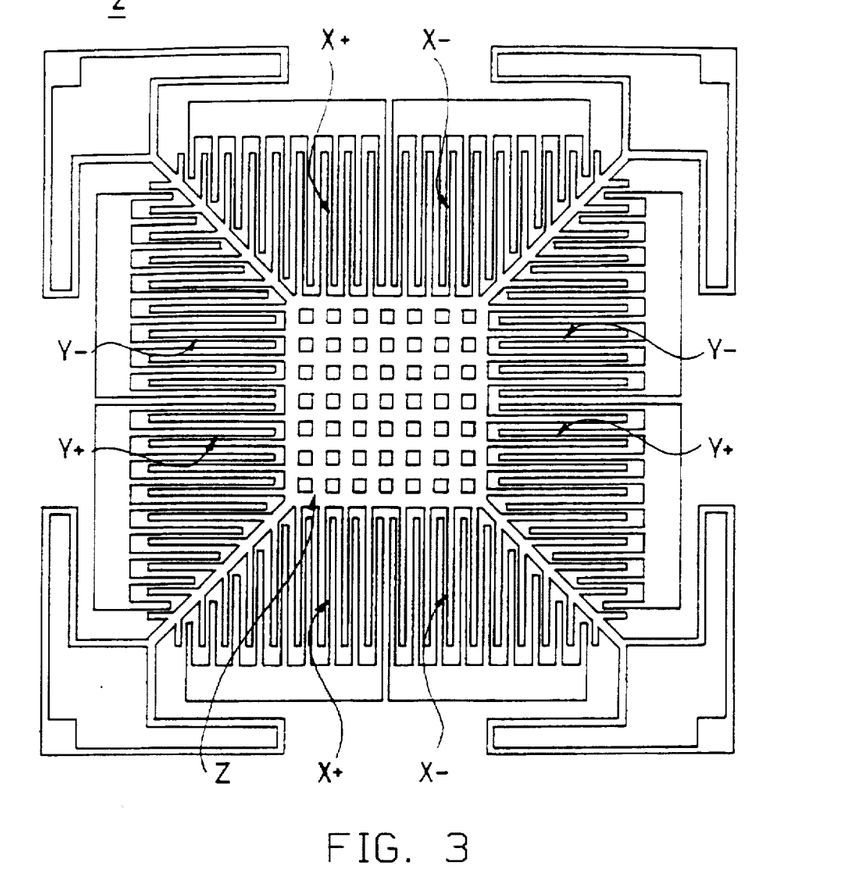
FIG. 3 is a view similar to FIGS. 1 and 2 using different reference characters for the purpose of explaining another method of using the sensor and FIG. 3(A) depicts the X–Y axes of the FIG. 3 sensor.
Figure 3A:
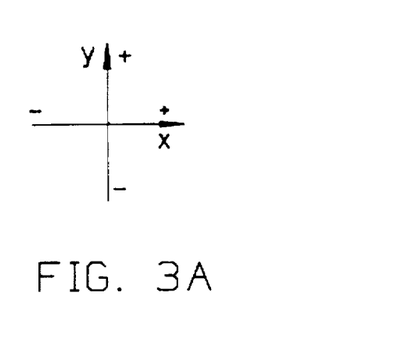

Composite sensor 2 can be used as a composite sensor for determining the acceleration components in the three axial directions, i.e., the X, Y and Z-axes even when the movable electrode is not vibrated. The method of measuring the acceleration in such a case will be explained by re-allocating the reference characters as shown in FIG. 3.

Variable capacitors bearing the code X+ are those whose capacitance increase when movable electrode G has moved in the positive direction of the X-axis in the figure. Similarly, the codes X−, Y+ and Y− are those whose capacitance increase when movable electrode G has moved in the negative direction of the X-axis, the positive direction of the Y-axis and the negative direction of the Z-axis.

Figure 5:
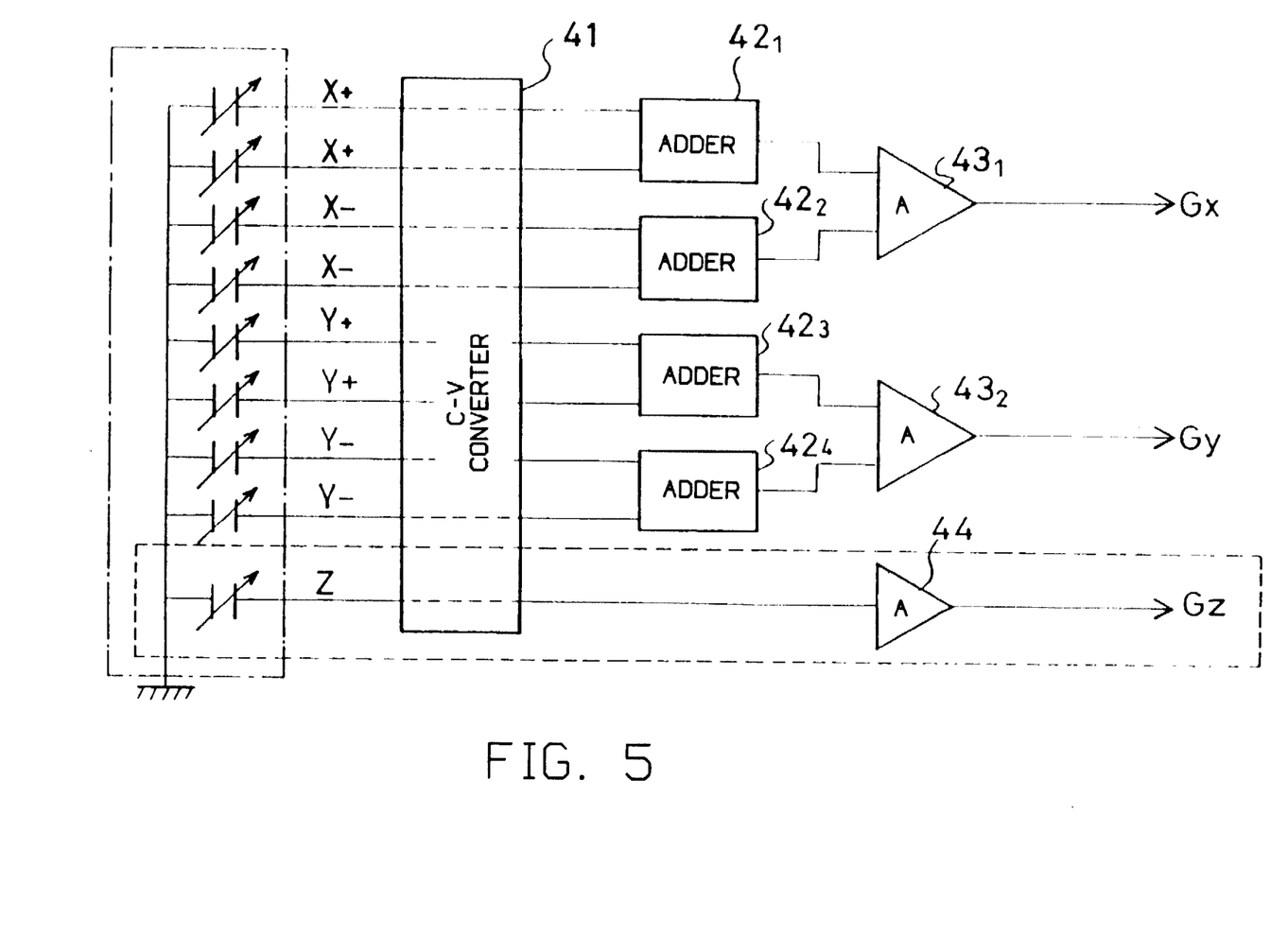
FIG. 5 is a block diagram of a circuit for measurement of the components of motion in three mutually perpendicular, axial, directions of acceleration using the composite sensor of the invention.

The charge values of two variable capacitors X+ are converted into voltage by C-V converter 41 of the measuring circuit in the block diagram shown in FIG. 5 and are added by adder $42_1$. Similarly, the charge values of two variable capacitors X− are converted into voltage by C-V converter 41 and added by adder $42_2$. The outputs of adder $42_1$ and adder $42_2$ are inputted to amplifier $43_1$ and, when differentially amplified, a signal Gx, which shows the acceleration component in the direction of the X-axis, is outputted.

Similarly, the charge values of two variable capacitors Y+ and two variable capacitors Y− are also converted into voltage by C-V converter 41 and, after being added respectively by adders $4_3$ and $42_4$, are differentially amplified by amplifier $43_1$ and a signal showing the acceleration component Gy in the direction of the Y-axis is outputted. If, at this time, the charge variation of the parallel plate-type capacitor Z comprising mass part H and the silicon substrate is converted into voltage by the C-V converter, followed by amplification by amplifier 44, a signal that shows the acceleration in the direction of the Z-axis can be obtained as well.

If, the change in charge of the various capacitors are detected in this manner, it is possible to determine the components in the three axial directions (X, Y and Z-axes) of the acceleration.

It is also possible to simply use the sensor as an angle velocity sensor for one axis. In such a case, two operational modes will be described.

The magnitude of this vibration can be detected by the variations in charge in the variable capacitors Y+ and Y−. Therefore, the angular velocity of the rotation around Z-axis can be determined.

The second operational mode relates to the detection of the angular velocity around the X or the Y-axis. When the movable electrode vibrates in the direction of the X-axis and a rotation is produced around the Y-axis, a vibration in the direction of the Z-axis is generated in movable electrode G. The magnitude of this vibration can be obtained by detecting the change in charge in the capacitor of the parallel plate-type formed between the mass part and the substrate. The same can be said about the rotation around the X-axis.

According to the invention as described above, the angular velocities of each of the three axes can be detected. Since switching can be easily implemented by an electronic circuit, this sensor can be used even when it is desired to detect rotation, in turn, around various axes. Advantageously, the composite sensor of the invention can be manufactured by the same micro-machining process. The sensor is highly practical in that the angular velocity and the acceleration components in the direction of three axes can be detected by using one composite sensor. In addition, the sensor is small in size and light in weight and thus can be readily placed on a printed substrate. Its electrical connections with the angular velocity sensor, the acceleration sensor and the measuring circuit can be easily effected with high reliability. In the case where the same variable capacitors are used by switching between detection and driving, the driving force is increased and the detection sensitivity is also enhanced.

Although the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed:

1. A solid state composite sensor comprising:
   a stationary substrate having spaced support portions for mounting a movable electrode member,
   a respective flexible arm attached to each support portion,
   a movable electrode member formed generally in an X-shaped configuration having four legs, each leg attached to a respective flexible arm, the legs extending and attached to a central portion, a plurality of elongated teeth lying in a common plane which includes mutually perpendicular X and Y directions and extending outwardly from each leg, the teeth of each leg in each of the X and Y directions being in parallel relationship with one another, and
   stationary electrodes having a plurality of elongated teeth lying in the common plane and interdigitated with the elongated teeth of the movable electrode in parallel relationship with adjacent teeth of the movable electrode to form therewith parallel plate-type variable capacitors responsive to movement of the movable electrode in the X and Y directional components of movement parallel to the common plane.

2. A solid state composite sensor according to claim 1 in which each leg has a longitudinal axis and the teeth extend from either side of the leg at an angle of 45 degrees from the respective axis.

3. A solid state composite sensor according to claim 1 in which the central portion forms a movable electrode forming a parallel plate-type variable capacitor with a stationary electrode formed on the stationary substrate responsive to movement of the central portion in a direction perpendicular to the common plane.

4. A solid state composite sensor according to claim 1 in which the stationary substrate and the movable and stationary electrodes are composed of monocrystalline silicon.

5. A solid state composite sensor according to claim 1 further comprising means to cyclically impress a voltage across the variable capacitors to vibrate the movable electrode and means to detect the Coriolis force added to the movable electrode by the change in charge on the variable capacitor upon rotary movement of the sensor and calculate the angular velocity of the sensor.

6. A solid state composite sensor according to claim 5 in which the variable capacitors are impressed with a voltage every half cycle of the vibration and the charge on the variable capacitors are monitored during every other half cycle when voltage is not impressed.

\* \* \* \* \*